Oct. 30, 1962 W. F. SOMMER ETAL 3,060,846
PRINTING CONTROL MEANS FOR ACCOUNTING MACHINES
Filed April 4, 1960 3 Sheets-Sheet 1

INVENTORS
WILLIAM F. SOMMER
DEAN B. JACKSON
BY *Louis A. Kline*
*Albert L. Sessler, Jr.*

THEIR ATTORNEYS

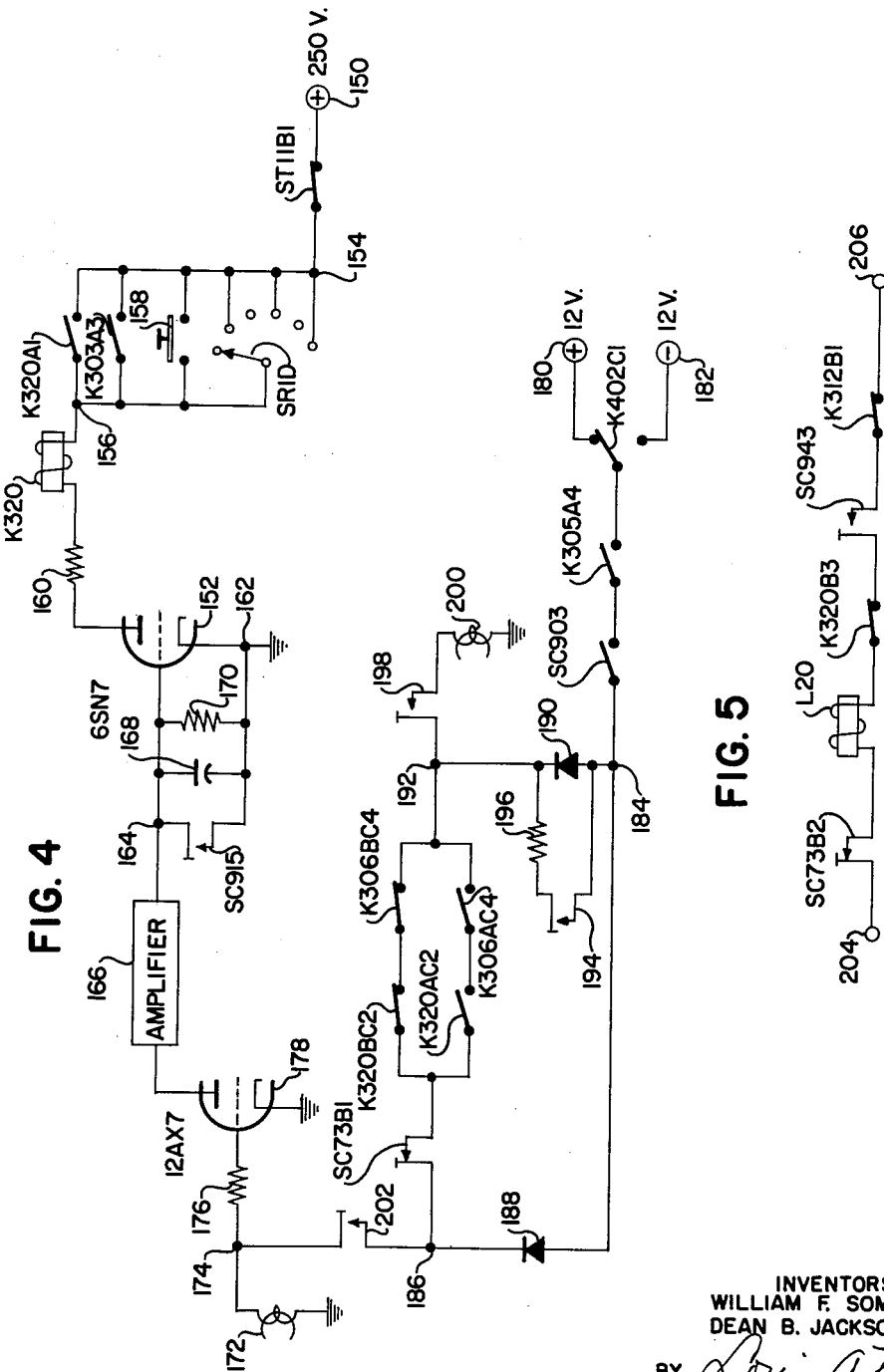

Oct. 30, 1962  W. F. SOMMER ETAL  3,060,846
PRINTING CONTROL MEANS FOR ACCOUNTING MACHINES
Filed April 4, 1960  3 Sheets-Sheet 3

FIG. 6

| REF.NO | CHECKS | DEPOSITS | DATE | BALANCE | S | REF.NO | CHECKS | DEPOSITS | DATE | BALANCE | S |
|---|---|---|---|---|---|---|---|---|---|---|---|
| | | BAL.FORWARD | | | | | | | | 801.73 | 1 |
| 975 | 25.00 | | JAN 5,60 | 784.50 | | | | | | 781.23 | 2 |
| 977 | 10.40 | | JAN 7,60 | 759.50 | | 1011 | 5.50 | | MAY 19,60 | | 3 |
| 974 | 7.80 | | | | | 1010 | 15.00 | | MAY 23,60 | | 4 |
| 973 | | 150.00 | JAN 12,60 | 741.30 | | | | | | | 5 |
| 980 | 32.50 | | JAN 14,60 | 891.30 | * | | | | | | 6 |
| 979 | 105.00 | | JAN 15,60 | 858.80 | * | | | | | | 7 |
| 983 | 44.70 | | JAN 22,60 | 709.10 | * | | | | | | 8 |
| 978 | 2.75 | | JAN 25,60 | 706.35 | | | | | | | 9 |
| 982 | 15.80 | | | | | | | | | | 10 |
| 986 | | 250.00 | JAN 27,60 | 940.55 | * | | | | | | 11 |
| 984 | 17.40 | | FEB 7,60 | 885.30 | * | | | | | | 12 |
| 985 | 10.75 | | FEB 8,60 | 865.30 | * | | | | | | 13 |
| 976 | 27.10 | | FEB 9,60 | 835.30 | | | | | | | 14 |
| 981 | 20.00 | | | | | | | | | | 15 |
| 987 | 30.00 | | | | | | | | | | |
| 1000 | 125.40 | 200.00 | MAY 6,60 | 975.50 | * | | | | | | 36 |
| 1007 | 37.50 | | MAY 17,60 | 801.73 | * | | | | | | 37 |
| 1006 | 10.87 | 50.00 | MAY 18,60 | 801.73 | * | | | | | | 38 |
| 1008 | | | | | | | | | | | 39 |
| 1005 | 50.00 | | | | | | | | | | 40 |

INVENTORS
WILLIAM F. SOMMER
DEAN B. JACKSON
BY Louis A. Kline
Albert L. Sessler, Jr.
THEIR ATTORNEYS United States Patent Office 3,060,846
Patented Oct. 30, 1962

3,060,846
PRINTING CONTROL MEANS FOR ACCOUNTING MACHINES
William F. Sommer, Xenia, and Dean B. Jackson, Dayton, Ohio, assignors to The National Cash Register Company, Dayton, Ohio, a corporation of Maryland
Filed Apr. 4, 1960, Ser. No. 19,915
12 Claims. (Cl. 101—93)

This invention relates generally to accounting machines which operate in conjunction with a magnetically encoded ledger card to enable the picking up of an old balance and other information from the ledger card and the subsequent recording of a new balance and other information on the ledger card at the end of an accounting transaction. In particular, the invention relates to such a machine in which the information to be recorded is printed in a series of columns on both sides of the front of a ledger card having magnetic encoding means on its back, a complete entry of information pertaining to a single transaction utilizing only those columns on one side of the card. When the vertical columns on one side of the card have been filled, automatic controls cause the next printing entry to be made at the top of the available space on the other side of the card. Thus, for example, on a card having forty line-spaces from top to bottom, the first forty transactions might be recorded on the left side of the card, after which the next forty transactions would be recorded on the right side of the card.

The present invention is well adapted for use with an accounting machine of the type disclosed in the United States patent application, Serial No. 610,754, filed September 19, 1956, by inventors Konrad Rauch et al., now Patent No. 2,947,475, issued August 2, 1960, but is not limited to use with such a machine.

In the above-cited patent application, the accounting machine there shown is adapted to use a ledger card on which duplicate information is printed on two sides, after which the card is divided into two parts, one of which is retained by the business organization using the machine, and the other of which is transmitted to the customer to whom the particular account pertains.

A need has now become apparent for a similar accounting machine adapted for use with an accounting system in which no statement is transmitted to the customer. In such a system, it is desirable that the machine be constructed so that it can print entries in columnar form on one side of the ledger card, and then automatically continue such columnar form on the other side of the card. This effectively doubles the capacity of the ledger card and results in valuable savings.

In the present invention, the automatic shifting of printing from one side of the ledger card to the other is accomplished by the storage and sensing of a magnetically encoded signal on one of the available magnetic stripes with which the ledger card is provided. Means are provided for storing such a signal at appropriate times, and for sensing of such a signal. The sensing of such a signal is effective to cause printing of the required information one one side of the ledger card, while the absence of such a signal is effective to cause printing on the other side of the card. Means are also provided for manual selection of a particular side of the ledger card for printing.

In the event that it is desired to use the machine of the present invention in conjunction with an accounting system which requires transmission of a duplicate section of the ledger card to a customer, the operation of a lever by the machine operator conditions the machine to print the same information simultaneously on both sides of the ledger card.

Accordingly, it is an object of the present invention to provide an accounting machine capable of selective sequential printing on certain areas of a ledger card.

A further object of the invention is to provide an accounting machine capable of printing at a given time on either of two sections or areas of a ledger card, according to the presence or absence of a control signal stored on the ledger card, and also according to the remaining space available for printing in the section of the card being printed upon.

An additional object of the invention is to provide an accounting machine capable of printing on either of two sections of a ledger card, or simultaneously on both sections, according to the choice of the machine operator.

Another object of the present invention is to provide an accounting machine capable of storing a magnetically encoded signal on a ledger card to control the location of printing in the next machine operation.

With these and other objects, which will become apparent from the following description, in view, the invention includes certain novel features of construction and combinations of parts, a preferred form or embodiment of which is hereinafter described with reference to the drawings which accompany and form a part of this specification.

In the drawings:

FIGS. 4 and 5 show certain operating circuits utilized in an accounting machine embodying the present invention.

FIG. 6 shows a ledger card on which entries have been made, using an accounting machine embodying the present invention.

GENERAL DESCRIPTION

Figure 1:
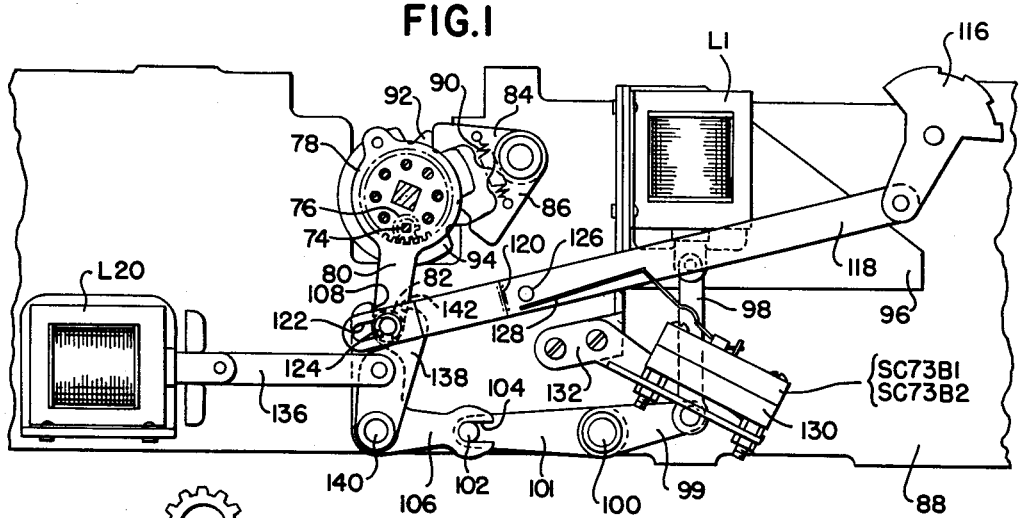
FIG. 1 is a fragmentary detail view from the left of the machine, showing the mechanisms for controlling the printer selection means.

The present invention is here shown embodied in an accounting machine of the type described and claimed in the United States patent application, Serial No. 610,754, filed September 19, 1956, by Konrad Rauch et al. This accounting machine is controlled from a ledger card, on which are printed the usual amounts pertaining to the account, such as the checks and deposits, the balances after each transaction entry, the sign of the balance, the date, etc. In addition, the ledger card has magnetically recorded thereon the last balance and related data, such as a comparator number, the sign of the balance, and the number of the line on which the next entry is to be printed on the ledger card.

A plurality of sensing and recording means are provided in the accounting machine of the previously mentioned United States application, Serial No. 610,754, for sensing the data which is magnetically encoded on the ledger card, and for erasing previously stored data and recording new data thereon. The heads are electrically connected to the data-retaining means in the accounting machine, so that data on the ledger card may be entered into the accounting machine, and so that data produced by the accounting machine may be recorded on the card. The machine is also controlled from a keyboard, on which data may be set, to be printed on the card and to be combined with data read from the card to form new balances. In a new-balance-recording operation, the data pertaining to the new balance is printed on a ledger card, the previous magnetically stored data is erased, and the new balance and related data pertaining to the new balance are magnetically stored on the card in its place.

In addition to the usual interlocks which have been previously provided on bank posting machines, the machine described and claimed in the previously cited United States patent application is provided with a number of further safeguards to insure correctness of the pickup operation.

The accounting machine is also provided with extremely flexible controls which enable it to perform different types of operations involving reading and recording operations on the cards. For example, with one setting of the controls, the card-reading operation may be eliminated, and data may be set up on the keys of the machine and recorded magnetically on the card; with another setting of the controls, a normal posting operation may take place, involving the reading of the card to pick up the old balance, the entering of checks and/or deposits by operation of the machine under control of the keys, and the recording of the new balance on the card; with a further setting of the controls, the machine may be controlled to transfer certain stored data from one card to another, as at the end of the month or other accounting period, and, in this operation, data is read from a card and set up in the machine, the old card is removed from the machine and a new card is put into the machine, and certain of the data which was read is recorded on the card; and, with a still further setting, the controls will be effected to cause the machine to operate in a trial balance operation, in which the stored data is read, the old balance is entered into the machine, and the card is ejected without erasure of the stored data or recording of any further data thereon.

For a more detailed description of the construction and operation of those parts of the accounting machine which do not form a part of the present invention, reference may be had to the previously mentioned United States patent application, Serial No. 610,754.

*Printer*

Figure 2:
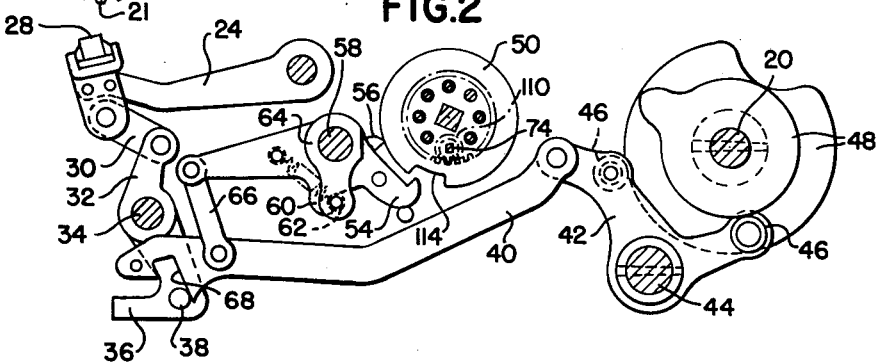
FIG. 2 is a fragmentary detail sectional view from the right of the machine, showing a typical printing hammer and an associated type wheel for printing on one side of the ledger card, and also showing the mechanism for controlling operation of the hammer.
Figure 3:
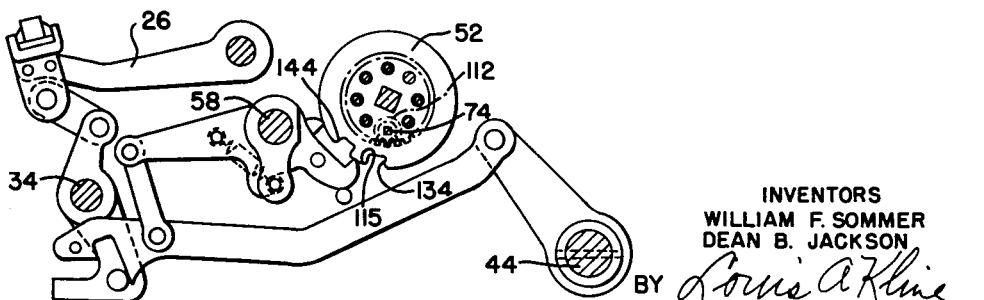
FIG. 3 is a view similar to FIG. 2, also from the right of the machine, showing a typical hammer, type wheel, and hammer control mechanism for printing on the other side of the ledger card.

The printing mechanism, two portions of which are shown in FIGS. 2 and 3, is operated by cams on the printer cam shaft 20, which is driven from the main cam shaft (not shown) of the accounting machine. The drive for the cam shaft 20 extends through a gear train and a clutch (not shown), in a manner which is described and claimed in the United States patent to Everett H. Placke, No. 2,351,541, which was issued on June 13, 1944.

In the machine to which the present invention is shown applied, type wheels 21 (FIG. 2), for printing on the left side of a ledger card, such as the ledger card 18, shown in FIG. 6, and type wheels 22 (FIG. 3), for printing on the right side of the ledger card 18, are mounted on a shaft 23 in groups, one group being provided for each column in which information is to be recorded on the ledger card. An individual hammer, such as the hammer 24 in FIG. 2, and the hammer 26 in FIG. 3, is provided for making impressions in each column.

The printing wheels in each group are positioned from the various differential mechanisms of the accounting machine through internal gear drives such as that shown and described in the United States patent to Walter J. Kreider, No. 1,693,279, which issued on November 27, 1928. The selection and operation of a particular hammer are under control of notched control plates, which in turn are controlled by a unit which includes a group of square shafts, each having thereon a pinion driven by internal teeth of an internal-external gear. These gears and the driving mechanism therefor form an internal gear drive unit substantially like that shown in the above-mentioned Kreider United States patent.

These internal-external gears are distributed at various points on the group of shafts, and also carried by the various square shafts are pinions which mesh with the internal gear teeth of selecting and control disks to select the various printing hammers and to control the operation of these various units, such as the card carriage feeding mechanism, which carriage supports the ledger card; the hammers for recording on the ledger card; and various other mechanisms within the printing mechanism. For a more complete description of these mechanisms and controls, reference may be had to the United States patent to Pascal Spurlino et al., No. 2,373,510, which issued on April 10, 1945.

The printing hammer 24 is provided with a platen 28, and has connected thereto a link 30, which in turn is connected to an arm 32, forming a toggle connection. The arm 32 is pivoted on a shaft 34. Also connected to the arm 32 is an arm 36, carrying a stud 38. Associated with each stud 38 is a link 40, pivoted to an arm 42, secured to a shaft 44. The arm 42 is provided with a pair of rollers 46, coacting with a pair of cam plates 48 on the printer cam shaft 20.

Similar mechanism is provided for the hammer 26 and for the other hammers used in printing on the two sides of the ledger card 18.

The hammer, such as the hammer 24, which is to be operated is selected under control of means comprising notched plates set under control of the transaction banks, and other control means of the accounting machine, including the novel control means which form a part of the present invention. The notched plates 50 (FIG. 2) and 52 (FIG. 3), for the printing mechanisms for the left and right sides of the ledger card 18, respectively, are set under control of the novel print control means of FIG. 1, in a manner which will be described subsequently.

As shown in FIG. 2, coacting with the notched plate 50 is a feeler arm 54, on which is supported a two-fingered pawl 56. The arm 54, together with corresponding arms for the other hammers in the printing mechanism, is pivoted on a shaft 58, and each arm 54 is provided with a finger 60, held in engagement with a stud 62, on an arm 64, secured to the shaft 58. The free end of the feeler arm 54 is provided with a link 66, pivoted to the previously mentioned link 40. The forward end of the link 40 is provided with a notch 68, which may be lowered into engagement with its associated stud 38.

During the operation of the machine, when the printer cam shaft 20 is operated, the arm 64 is rocked to move the feeler arm 54 and the feeler pawls 56 toward their associated plate or plates. If the feeler arm 54 and the feeler pawls 56 are permitted to drop into notches, the arm 54 is rocked counter-clockwise, as viewed in FIG. 2, thus lowering the link 66 and engaging the notch 68 of the link 40 over the stud 38 of its associated printing hammer mechanism. Thereafter, during the machine operation, the cams 48 rock the cam follower arm 42 and the shaft 44 clockwise. This moves the link 40 to the right, as viewed in FIG. 2, and, through the stud 38, rocks the arm 36 counter-clockwise. Rocking of the arm 36 straightens the toggle consisting of the arm 32 and the link 30, thus raising the hammer 24 to make an impression on the ledger card 18.

The feeler-operating shaft 58 is rocked by a pair of cams (not shown) secured to the printer cam shaft 20. When the printer cam shaft 20 is actuated during an operation in which a print is to be obtained, these cams rotate to shift a linkage (not shown) in such a manner that a counter-clockwise movement is imparted to the shaft 58. Counter-clockwise movement of the shaft 58 rocks all of the arms 64 counter-clockwise, thus moving the feeler arms 54 and the feeler pawls 56 into engagement with their control plates to determine which of the printing hammers is to be operated during the ensuing operation of the machine.

DETAILED DESCRIPTION

Print Control Means

The portion of the ledger card which will be printed upon during any operation of the accounting machine of the present invention is determined by the various control elements shown in FIG. 1. These elements exert their control through a square shaft 74, forming part of the internal gear drive unit for controlling printing on the ledger card, in a well-known manner.

The square shaft 74 is rotated by means of a pinion 76, fixed to said shaft and having teeth which mesh with internal teeth in a circular opening in a member 78, having an integral arm 80, with a stud 82 fixed therein.

A pair of aliner pawls 84 and 86 are pivotally mounted on a frame 88 of the accounting machine and are urged by a spring 90 toward each other and into engagement with a pair of aliner plates 92 and 94, which are geared together and which form part of the internal gear drive unit. The plates 92 and 94 have alining notches spaced along their peripheries at thirty-degree intervals, and the aliner pawls 84 and 86, cooperating with said plates, are offset with respect to each other, so that the selecting plates of the internal gear drive unit with which the plates 92 and 94 are geared may be set at fifteen-degree intervals, and will then be held in position by the engagement of one of the aliner pawls 84 and 86 with its corresponding plate 92 or 94. The aliner pawls are cammed out of the notches with which they are engaged by cooperating surfaces of the notch and the pawl whenever the positions of the plates 92 and 94 are changed by rocking of the member 78. It will be apparent that a single aliner plate having notches at fifteen-degree intervals, together with a single aliner pawl, could be employed if desired.

The various elements of the internal gear drive unit are set to the positions in which they are shown in FIGS. 1, 2, and 3 by a linkage actuated by the gripper solenoid L1, which is fixed to the frame 88 by a bracket 96. As fully described in the previously cited United States patent application, Serial No. 610,754, the gripper solenoid L1 is normally energized after each operating cycle of the accounting machine when the accounting machine is in "home" position, with power applied to the machine. Accordingly, the solenoid L1 is shown in energized condition in FIG. 1.

A link 98 is connected to the plunger of the solenoid L1 at one end, and is connected at its other end to one end of an arm 99, fixed on a shaft 100, supported by the frame 88. A second arm, 101, is also fixed to the shaft 100, and a stud 102, fixed to the other end of the arm 101, cooperates with a notch 104 in one arm of a lever 106, pivotally mounted on a stud 140, fixed to the frame 88. A second arm of the lever 106 is provided with a surface 108, adapted to engage the stud 82 of the arm 80 on the member 78.

It will be seen that, when the solenoid L1 is energized, as shown in FIG. 1, it is effective, through the link 98, the arms 99 and 101, the lever 106, and the stud 82, to cause the member 78 to be positioned as shown in FIG. 1. This, in turn, is effective, through the internal gear drive unit, to position the pinions 110 (FIG. 2) and 112 (FIG. 3) to set the plates 50 and 52, and similar plates associated with the various printing hammers for printing on the ledger card, to the positions in which said plates are shown in FIGS. 2 and 3. It will be noted that the view of FIG. 1 is taken from the left of the machine, while the views of FIGS. 2 and 3 are taken from the right of the machine.

The plate 50 is set by the pinion 110 so that a notch 114 is located opposite the feeler arm 54. Other selecting plates for controlling printing on the left side of the ledger card are similarly set. This permits operation of the hammers 24 by the cam plates 48 to effect printing on the left side of the ledger card of information set on the type wheels 21, as previously described.

As shown in FIG. 3, the plate 52 is positioned by the internal gear drive unit so that a high portion 115 of said plate is located opposite the corresponding feeler arm. Other selecting plates for controlling printing on the right side of the ledger card are similarly set. Consequently, operation of the hammers 26 to effect printing on the right side of the ledger card of the information set on the type wheels 22 is prevented, and no printing takes place on the right side of the ledger card at this time.

It will be clear from the above that the internal gear drive unit is set at the beginning of each balance pickup cycle of accounting machine operation so that printing will take place on the left side of the ledger card, but not on the right side, so long as no further setting is made of the internal gear drive unit. Two additional control elements are provided to alter the setting of the internal gear drive unit and to provide other printing arrangements on the ledger card where appropriate.

One of these additional control elements includes a lever 116, which is pivotally mounted on the machine frame 88, and which is pivotally connected at its lower end to a link 118. Said link is bent, as indicated at 120, intermediate its ends for clearance purposes, and is provided adjacent its other end with a slot 122, in which rides a reduced portion of the stud 82. The link 118 is retained on the stud 82 by a clip 124.

A stud 126 is fixed to the link 118 in such position as to cooperate with an actuator 128 of a switch 130 secured by a support 132 to the bracket 96 and containing the contacts SC73B1 and SC73B2. These contacts are normally closed, but are opened by the actuator 128 when the lever 116 is moved from the position in which it is shown to the other of its two positions. The manner in which these contacts function in the operating circuitry of the machine will be described subsequently.

Movement of the lever 116 from the position in which it is shown, to the other of its positions, is also effective, through the link 118, to shift the member 78 fifteen degrees counter-clockwise. This movement is transmitted through the internal gear drive unit and the pinions 110 and 112, fixed on the square shaft 74, to set the plate 50 of FIG. 2 and the plate 52 of FIG. 3 so that both plates, as well as all similar plates, have a notch located opposite their respective feeler arms and feeler pawls. In the case of the plate 50 and similar plates, the notch 114 is of sufficient extent to present itself opposite the feeler arms and the feeler pawls even when the plate has been shifted fifteen degrees, and, in the case of the plate 52 and similar plates, a notch 134 is provided. This enables printing to take place simultaneously on both sides of the ledger card in the manner previously described.

The second additional control element includes a solenoid L20, mounted on the frame 88. Said solenoid is shown in FIG. 1 in deenergized condition, and may be selectively energized during a cycle of machine operation in a manner which will subsequently be described in the explanation of the operating circuitry. The plunger of the solenoid L20 is pivotally connected to one end of a link 136, which is pivotally connected at its other end to an arm 138, pivotally mounted on the stud 140. A surface 142 on the arm 138 is arranged to cooperate with the stud 82 on the arm 80 of the member 78.

Energization of the solenoid L20 is effective, through the link 136 and the arm 138, to rock the member 78 fifteen degrees clockwise. This movement is transmitted through the internal gear drive unit to set the plate 50 of FIG. 2, and similar plates for controlling printing on the left side of the ledger card 18, so that a high portion is located opposite their respective feeler arms and feeler pawls, thus disabling printing on the left side of the ledger card 18.

The plate 52 of FIG. 3, and similar plates for controlling printing on the right side of the ledger card 18, are set by the internal gear drive unit so that notches, such as the notch 144 on the plate 52, are positioned opposite corresponding feeler arms and feeler pawls, thus enabling printing to take place on the right side of the ledger card 18.

The manner in which the various control elements are coordinated to produce the proper printing on the ledger card 18 will be described subsequently.

*Operating Circuitry*

The various operating circuits which form a part of the illustrated embodiment of the present invention are shown in FIGS. 4 and 5. Only so much of the conventional circuitry of the accounting machine in which the present invention is embodied as is necessary to an understanding of said invention is shown. For a detailed description of other parts of the operating circuitry of the accounting machine, reference may be had to the previously mentioned United States patent application, Serial No. 610,754.

Shown in FIG. 4 is the energizing circuit for the relay K320. This circuit extends between a terminal 150, to which may be applied a source of +250 volts D.C. potential, and a base reference potential, shown here as ground, which is connected to the controls of a tube 152, which may be of type 6SN7. Between the terminal 150 and a point 154 are serially connected the contacts ST11B1, which are controlled by a manually-operable switch on the accounting machine, and which provide means for the machine operator to enforce printing on the right side of the ledger card, as will be described subsequently.

Between the point 154 and a second point 156 of the circuit of FIG. 4 are a plurality of parallel paths.

The first circuit path includes contacts K320A1, which are controlled by the relay K320 and which close to complete a holding circuit for said relay when it has been energized.

A second circuit path between the points 154 and 156 includes the contacts K303A3, which are closed by energization of a relay K303 during the initiation of a balance pickup cycle of operation of the accounting machine.

A third circuit path includes the contacts 158, which are closed during a "remake" cycle of operation of the accounting machine, used when it is desired to remake a ledger card pertaining to a particular account.

A fourth circuit path between the points 154 and 156 includes the multiple-position switch SR1D, which is controlled by the function control knob of the accounting machine. This path is completed whenever the function control knob is set to "install," "transfer," or "add" positions, to permit the relay K320 to be energized when any one of these operations is performed by the accounting machine.

The point 156 is connected to one side of the relay K320, and a resistor 160, of 4,700 ohms, is connected between the other side of the relay K320 and the anode of the tube 152.

The cathode of the tube 152 is connected over a point 162 to a base reference potential, shown herein as ground, and the control electrode of the tube 152 is connected over a point 164 to a conventional amplifier system shown schematically at 166. Between the points 162 and 164 in the cathode and control electrode circuits of the tube 152, respectively, are connected contacts SC915, which are normally open, and which are controlled by a cam in the accounting machine. These contacts are opened by said cam when the accounting machine is performing a pickup cycle of operation, to permit signals sent at this time to control the conduction in the tube 152. However, said contacts are closed at other times to prevent any stray signals which may be picked up from having any effect on conduction of the tube. With the contacts SC915 closed, it will be seen that point 164 in the control electrode circuit of the tube 152 is connected directly to ground.

Connected in parallel with the contacts SC915, between the points 162 and 164, are a capacitor 168 and a resistor 170. These components cooperate to perform a time delay function to maintain the control electrode of the tube 152 negative with respect to the cathode of said tube when a negative pulse has been impressed upon the control electrode circuit, for a time longer than the actual duration of the pulse. This is done to insure that the tube 152 is cut off for a sufficiently long time that the relay K320 is sure to be deenergized.

The signal which is effective to act upon the control electrode circuit of the tube 152 is picked up from the print control stripe 19 of the ledger card 18 by means of the combined sensing and recording head 172. Said signal is transmitted over a point 174 and a resistor 176 to the control electrode of the tube 178, which may be of type 12AX7. The cathode of this tube is connected to a base reference potential, shown herein as ground, while the anode of said tube is connected directly to the amplifier system 166. It will thus be seen that the signal which is picked up by the head 172 is inverted by the tube 178 and amplified and inverted by the amplifier system 166 before being applied to the control electrode of the tube 152 to control conduction of said tube, and thus control whether or not the relay K320 is maintained in energized condition.

The relay K320 is energized during certain types of accounting machine operations, provided that the contacts ST11B1 are maintained in closed condition by the machine operator. If these contacts are opened, energization of the relay K320 cannot take place, and all printing is done on the right side of the ledger card 18, so long as space for printing is available on that side.

Assuming that the contacts ST11B1 are closed, the relay K320 may be energized by setting the switch SR1D to "add," "transfer," or "install" position; by operating the "remake" contacts 158; or by depressing the balance pickup bar of the accounting machine, thus energizing the relay K303 and closing the contacts K303A3. The energizing circuit for the relay K320 extends from the terminal 150 over the contacts ST11B1, the selected one of the contacts SR1D, 158, or K303A3, the relay K320, the resistor 160, the anode and cathode of the tube 152, and the point 162 to ground.

Energization of the relay K320 is effective to close the relay contacts K320A1 to complete a holding circuit for maintaining said relay in energized condition even after the contacts which were initially responsible for energization of the relay, such as K303A3, have been opened. Energization of the relay K320 also causes opening of the contacts K320B3 in the energizing circuit for the solenoid L20 (FIG. 5), as will be described subsequently.

Deenergization of the relay K320 is accomplished by the sensing of a "magnetic spot," on the print control stripe 19 of the ledger card 18, by the recording and sensing head 172. The signal is transmitted over the point 174, the resistor 176, the tube 178, the amplifier 166, and the point 164, and is applied to the control electrode of the tube 152. Since this signal, in its amplified form, is a negative-going signal, it is effective to cut off conduction in the tube 152 and thus interrupt the energizing circuit for the relay K320. Said relay, accordingly, is deenergized, and its holding circuit is opened by opening of the contacts K320A1. In addition, the contacts K320B3 in the energizing circuit for the solenoid L20 (FIG. 5) are closed. It may be noted that the only time a signal sensed by the head 172 is effective to cut off conduction of the tube 152 is during a pickup cycle, since the contacts SC915 are closed at all other times, to prevent the application of a stray signal at point 164 from being effective to cut off conduction in the tube 152.

The storage of a signal on one of the magnetic stripes 19, which are provided on the back of the ledger card 18, is accomplished by the head 172 under control of an operating circuit shown in FIG. 4. This circuit is connected to the head 172 at point 174, and is supplied with a positive 12-volt D.C. source of potential at terminal 180, and with a negative 12-volt D.C. source of potential at terminal 182.

Contacts K402C1 are controlled by the relay K402 (not shown) and are operative to connect either the terminal 180 or the terminal 182 to the storage circuit, according to whether the ledger card 18 is being swept into the machine in an erasing movement, in which case the positive 12-volt D.C. potential applied to terminal 180 is utilized, or whether the card 18 is being swept outwardly, in which case the negative 12-volt D.C. potential applied to the terminal 182 is utilized.

The circuit path from the common of the contacts K402C1 to a point 184 includes two serially-connected contacts K305A4 and SC903. The contacts K305A4 are controlled by the storage relay K305 (not shown) and are closed when this relay is energized during a storage cycle of accounting machine operation. The contacts SC903 are controlled from a cam in the accounting machine and are also closed at a given time during the storage cycle of accounting machine operation.

A number of alternate circuit paths are provided between the point 184 and a point 186 in the circuit of FIG. 4. A first such path extends directly between these two points and includes a diode 188, which permits transmission of current of only one polarity in this branch.

Another diode 190 is provided in a path which extends between the point 184 and a point 192. Connected in parallel with the diode 190 are a series combination of contacts 194 and a resistor 196. The contacts 194 are operated in the acounting machine in a manner which is fully described in the previously mentioned United States patent application, Serial No. 610,754, to effect the storage of information of the "units line-finding" magnetic stripe 19 of the ledger card 18, which controls the selection, by the accounting machine, of the proper line for printing upon the ledger card.

From the point 192, a first circuit path extends over contacts 198, which are closed during a storage cycle, and the units line-finding sensing and recording head 200, to a base reference potential, shown herein as ground. The head 200 is effective to sense for a unit line-finding signal in the appropriate magnetic stripe 19 of the card 18 during a balance pickup operation of the accounting machine, and is effective to store a signal on said stripe during a new balance operation of the accounting machine, under the control of the contacts 194, as described in the United States patent application Serial No. 610,754, previously mentioned.

A circuit path also extends from the point 192 to the point 186, and includes two parallel branches serially connected to the contacts SC73B1. It will be recalled that these contacts are controlled by the lever 116 (FIG. 1). The first one of the parallel branches of this path includes the relay contacts K306BC4 and the relay contacts K320BC2 in serial connection. Both of these contacts are controlled by their respective relays, and both are in normally closed condition, so that they are opened by energization of their respective relays. The second of the two branches includes the serially-connected contacts K306AC4 and K320AC2. These contacts are also conttrolled by their respective relays K306 and K320, and are normally open, so that this branch is completed only when both of the relays K306 and K320 are energized. The point 186 is connected to the point 174 in the circuit of the head 172 over cam-operated contacts 202. These contacts are controlled by a cam in the accounting machine, and are closed during a storage cycle of accounting machine operation.

The mode of operation of the circuit for storing print control signals will now be described.

In a new balance operation of the accounting machine, as the ledger card 18 is swept into the machine, the contacts K402C1 are positioned to the path connecting the circuit of FIG. 4 to a +12-volt source of potential through the terminal 180. During this cycle, the contacts K305A4, SC903, 198, and 202 close. This completes a path through the diodes 188 and 190 to the heads 172 and 200, respectively. Since the diodes 188 and 190 are oriented to pass current of this polarity, the heads 172 and 200 are energized, with the result that the magnetic stripes 19 of the ledger card 18 pertaining to the print control and the units line-finding are magnetized in one direction uniformly throughout their length.

At the end of the in-sweep, and before the subsequent out-sweep of the card 18 commences, the contacts K402C1 are transferred, so that the circuit of FIG. 4 is now connected over the terminal 182 to the negative 12-volt D.C. source of potential.

The diodes 188 and 190 are effective to block current of this polarity, so that the only path available to the heads 172 and 200 is over the contacts 194. These contacts are controlled to close at the proper time to cause current to be passed to the head 200, to energize said head, and to thereby magnetize the magnetic stripe 19 for the units line-finding, from a given point onward during the outward sweep of the card, in a polarity opposite to that to which the stripe was magnetized on the inward sweep. This provides a magnetic discontinuity which may be sensed to provide line-finding information the next time the ledger card 18 is used. The circuit of FIG. 4 is arranged so that the same signal which is utilized for storage of line-finding information by the head 200 may also be utilized for storage of print control information by the head 172. It should be noted at this point that it is the presence or absence of a signal in the magnetic stripe 19 relating to print control which is of importance, and not the particular position of the magnetic discontinuity on that stripe.

In order for storage of a signal on the print control stripe 19 of the ledger card 18 to be effected, one of the two branches in the path extending from point 192 to point 186 must be completed, and the contacts SC73B1 must also be closed. In addition, the contacts 202 must be closed, as will be the case, since these contacts are controlled by a cam in the accounting machine.

As has been mentioned, the contacts SC73B1 are controlled by the lever 116 on the accounting machine, and these contacts are opened only when the lever 116 has been moved from the position in which it is shown in FIG. 1 to its second position, when it is desired that printing be effected on both sides of the ledger card 18. Therefore, the contacts SC73B1 will be closed in all cases where printing is to take place on either one side or the other, but not both sides, of the ledger card 18.

The relay K306 (not shown) is controlled by the position of the table which holds the ledger card 18 in the accounting machine. This relay remains deenergized until the table is shifted to a point where the last available line for printing on the ledger card is presented in printing position. At this point, the relay K306 energizes, causing the contacts K306BC4 to open, and causing the contacts 306AC4 to close. Therefore, it will be seen that the contacts K306BC4 are closed except when the table is in its "line 40," or last available line position, while the contacts K306AC4 are open, except when the table is in its "line 40," or last available line position.

The contacts K320AC2 and K320BC2 in the two branches are controlled by the relay K320 of FIG. 4. Therefore, the contacts K320BC2 will remain closed so long as the relay K320 is deenergized, while the contacts K320AC2 will close only when the relay K320 is energized. Accordingly, it will be seen that in normal operations of the accounting machine, the relay contacts K320AC2 are closed, and the contacts K320BC2 are opened, unless the manually operable contacts ST11B1 have been opened by the machine operator, or unless a signal has been sensed by the head 172 and applied to the control electrode of the tube 152 to cause said tube to stop conducting and thereby deenergize the relay K320.

It will therefore be seen that the upper branch, as shown in FIG. 4, containing the contacts of the relays K306 and K320, will be completed when a signal has been sensed from the print control stripe of the ledger card 18 and when the table is not in its "line 40" position, while the lower branch will be completed when the table is in its "line 40" position, and no signal has been sensed from the print control stripe of the ledger card 18 by the head 172.

Analysis of the print control storage circuit of FIG. 4 therefore reveals that a print control signal is stored on the print control stripe 19 of the ledger card 18 whenever the ledger card is in "line 40" position and no print control signal has previously been sensed by the head 172, or whenever the ledger card 18 is not in "line 40" position and a print control signal has previously been sensed from the print control stripe 19 of the ledger card 18 by the head 172.

Shown in FIG. 5 is the energizing circuit for the solenoid L20. This circuit extends between two terminals 204 and 206, to which is applied a source of 110 volts A.C. potential. Serially connected in the circuit are contacts SC73B2, the solenoid L20, contacts K320B3, contacts SC943, and contacts K312B1.

It will be recalled that the contacts SC73B2 are controlled by the lever 116 (FIG. 1) and that these contacts remain closed except when said lever is shifted into position to effect simultaneous printing on both sides of the ledger card 18.

It will also be recalled that the solenoid L20, shown in FIG. 1, is utilized to shift the internal gear drive unit to a position in which printing is effected on the right side of the ledger card 18, but not on the left side. This movement takes place whenever the solenoid L20 is energized.

The contacts K320B3 remain closed so long as the relay K320 (FIG. 4) remains deenergized. Energization of the relay K320 opens the contacts K320B3 and prevents energization of the solenoid L20.

The contacts SC943 are controlled by a cam in the accounting machine, and are closed during operation of the accounting machine to permit energization of the solenoid L20. These contacts are thus effective to prevent energization of the solenoid L20 before a certain time in the cycle of operation of the accounting machine.

The contacts K312B1 are controlled by the relay K312 (not shown) and are closed whenever said relay is deenergized. This occurs when the table carrying the ledger card is at home position. The relay K312 is energized when the table moves away from its home position, and at this time opens the contacts K312B1 to interrupt the energizing circuit for the solenoid L20.

It is seen from an analysis of the above contacts in the energizing circuit of the solenoid L20 that the contacts SC943 and K312B1 determine the time in the cycle of machine operation during which the energization of the solenoid L20 may take place; that the contacts K320B3 determine whether or not the solenoid L20 is to be energized, according to whether or not a print control signal has been sensed from the print control magnetic stripe 19 of the ledger card 18, and according to whether or not the contacts ST11B1 have been opened; and that the contacts SC73B2 control the energization of the solenoid L20 according to whether or not the lever 116 has been operated to effect printing of the ledger card 18 on both sides.

*Operation*

In order to illustrate the manner in which the various elements previously described function to control printing on the ledger card 18 in the desired manner, a number of typical operations of the accounting machine embodying the present invention will be described.

First of all, let it be assumed that it is desired to print simultaneously on both sides of the ledger card in a conventional manner. To cause this to take place, the lever 116 (FIG. 1) is shifted from the position in which it is shown to its other position, thus shifting the internal gear drive unit and opening the contacts SC73B1 and SC73B2. Due to the shifting of the internal gear drive unit, the notches 114 and 134 on the control plates 50 and 52, and all similar plates, are positioned opposite the corresponding feeler arms. This permits the printing hammers to cooperate with their respective type wheels to cause printing on both sides of the ledger card 18.

Also, the opening of the contacts SC73B1 interrupts the circuit for storage of a signal in the print control stripe 19 of the ledger card 18, and thus insures that no print control signal will be stored. The opening of the contacts SC73B2 prevents the energization of the solenoid L20 and insures that the plates 50 and 52, and similar plates, will not be shifted to a position in which printing would take place only on the right side of the ledger card.

With the lever 116 positioned as described above, it is therefore seen that ledger card printing takes place in a conventional manner.

When it is desired to utilize both sides of the ledger card in succession, rather than simultaneously, the lever 116 is set to the position in which it is shown in FIG. 1. In such case, the lever exerts no influence on the internal gear drive unit, and the contacts SC73B1 and SC73B2 remain closed and do not influence the print control storage circuit or the energizing circuit for the solenoid L20.

Let it be assumed now that, with the lever 116 in the position shown in FIG. 1, it is desired to make a balance pickup operation from a ledger card on which printing space is still available on the left side of said card. The card is inserted into the accounting machine and the balance pickup bar is depressed. This initiates a balance pickup operation of the accounting machine, and also causes energization of the relay K320 in the manner previously described. No signal is sensed from the print control stripe 19 of the ledger card 18, and therefore conduction in the tube 152 of FIG. 4 is not cut off, and the relay K320 remains energized. Since the relay K320 is energized, the contacts K320B3 in the energizing circuit for the solenoid L20 are open, and said solenoid is therefore prevented from energization. The internal gear drive unit, as a consequence, is not shifted from the position in which it was set before the initiation of the balance pickup operation by the solenoid L1. It will be recalled that this is the position which is shown in FIGS. 1, 2, and 3, and in which printing is caused to take place on the left side of the ledger card, but not on the right side of the ledger card.

Following the balance pickup operation, one or more posting operations are made, followed by a new balance operation. Let it be assumed that a number of lines are still available on the left side of the ledger card for printing, and, as a consequence, the relay K306 is not energized. Therefore, during the new balance operation, no circuit will be completed between the points 192 and 186 in the circuit of FIG. 4, and no print control signal will be stored in the appropriate magnetic stripe 19 of the ledger card 18.

As additional balance pickup operations and posting operations are made, and the available printing space on the left side of the ledger card is used, the capacity of that side of the card will be reached. At that time, when a new balance operation is made, the relay K306 is energized, and the contacts 306AC4 in the circuit of FIG. 4 are closed. Since the relay K320 is also energized, and the contacts K320AC2 are accordingly closed, a circuit is completed between points 186 and 192 over the lower of the two branches shown in FIG. 4. Now, when the units line-finding contacts 194 are closed during a new balance operation, a circuit path is provided over the contacts 194, the resistor 196, the contacts K306AC4, the contacts K320AC2, the contacts SC73B1, and the contacts 202, to energize the head 172. As a consequence, a signal is stored in the print control stripe 19 of the ledger card 18.

Now, on the next balance pickup operation, this print control signal is sensed by the head 172 and is amplified and applied to the control electrode of the tube 152 to deenergize the relay K320. This causes the contacts K320B3, in the energizing circuit for the solenoid L20, to close, to effect the energization of said solenoid. As described in connection with FIG. 1, energization of the solenoid L20 is effective to shift the internal gear drive unit so that printing will take place on the right side of the ledger card 18, and not on the left side.

A conventional sub-balance of the accounting machine is effective to cause printing of the balance pickup from the ledger card on line 0 on the right side of the ledger card and to position said card at line 1 for further posting operations. These operations may be carried on in a conventional manner. When the posting of a day's entries is completed, a new balance operation is made on the accounting machine. At this time, it is seen that, since the relay K320 is deenergized, the contacts K320BC2 in the circuit of FIG. 4 are closed, as are the contacts K306BC4, since the available printing space on the right side of the ledger card 18 has not been exhausted. Accordingly, during the storage portion of the new balance operation of the accounting machine, when the contacts 194 for recording a units line-finding signal are closed, a circuit is also completed over these contacts, the resistor 196, the contacts K306BC4, the contacts K320BC2, the contacts SC73B1, and the contacts 202, to the head 172, to energize said head and effect the storage of a print control signal on the print control stripe 19 of the ledger card 18.

Since a signal has been recorded on the print control stripe 19, the next balance pickup operating will cause energization of the solenoid L20 and will again cause printing on the right side of the ledger card. Recording of transactions on the right side of the ledger card 18 continues until the available space has been exhausted, at which time a new balance operation is made. In such a new balance operation, no signal is stored on the print control stripe 19 of the ledger card 18, since the relay K306 is energized, while the relay K320 is not energized, and therefore no path is available for transmission of current to the head 172 to store a signal on the print control stripe 19.

It will thus be seen that automatic means have been provided for controlling the printing on a ledger card 18 in such manner that the desired information concerning transactions pertaining to a particular account is printed first on the left side of the ledger card 18, and then on the right side when the available space on the left side has been exhausted.

Means are also available to cause initial printing on the right side of the ledger card rather than the left side. This is accomplished by operation of a switch controlling the contacts ST11B1 in the circuit of FIG. 4 to open said contacts. With the contacts ST11B1 open, the relay K320 cannot be energized, and therefore the contacts K320B3 in the energizing circuit of the solenoid L20 remain closed to permit energization of said solenoid. This causes the desired printing on the right side of the ledger card. The contacts ST11B1 should be closed by the machine operator after the first new balance operation.

So long as space is available for printing on the right side of the ledger card, a new balance operation causes the storage of a signal in the print control stripe 19 of the ledger card 18, due to the fact that a signal has been sensed from said stripe during the previous balance pickup operation. Therefore the next balance pickup and posting operations following this new balance operation will result in printing on the right side of the ledger card 18.

However, when the capacity of the right side of the card is reached, the relay K306 is energized, opening the contacts K306BC4 and closing the contacts K306AC4. The contacts K320BC2 will be closed, and the contacts K320AC2 will be open, due to the previous deenergization of the relay K320 by a signal sensed from the print control stripe during the last balance pickup operation. As a consequence, no print control signal is stored during the new balance operation taking place on line 40 of the right side of the ledger card 18. Therefore, when the next series of transactions pertaining to that account is recorded, printing on the card will commence on the first line of the left side.

It will also be seen that remake operations, in which the contacts 158 are operated, and operations in which the function control knob is set to "install," "transfer," or "add" position, will result in printing on the left side of the ledger card 18 when the lever 116 is in the position which is shown in FIG. 1, and the contacts ST11B1 are closed, since no print control signal will be sensed to cause deenergization of the relay K320. However, printing can be caused to commence on the right side of the ledger card in any of the above-named operations, if desired, by opening of the contacts ST11B1.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In a machine of the class described, capable of printing in one or the other of two selected areas of a record member in response to a magnetically encoded signal on the record member, and capable of encoding signals on the record member to determine the area to be selected for printing in the next machine operation, the combination comprising sensing and recording means capable of sensing a magnetically encoded signal from the record member and also capable of recording a magnetically encoded signal on the record member; a print control relay; first normally open switch means controlled by the print control relay; first normally closed switch means controlled by the print control relay; second normally open switch means which are closed when the available printing space in an area is exhausted; second normally closed switch means which are opened when the available printing space in an area is exhausted; recording switch means; a first circuit path extending from a source of power to the sensing and recording means and including the recording switch means, said first normally closed switch means and said second normally closed switch means; a second circuit path extending from a source of power to the sensing and recording means and including the recording switch means, said first normally open switch means and said second normally open switch means; and means to energize the print control relay and maintain it in energized condition during an operation of the machine, so long as no magnetically encoded signal is sensed by the sensing and recording means, whereby a magnetically encoded signal may be recorded on the record member under control of the recording switch means when the available printing space in an area is is exhausted and no signal has been sensed from the record member, and whereby a magnetically encoded signal may also be recorded on the record member under control of the recording switch means when the available printing space in an area has not been exhausted and a signal has been sensed from the record member.

2. In a machine of the class described, capable of printing in one or the other of two selected areas of a record member in response to a magnetically encoded signal on the record member, and capable of encoding signals on the record member to determine the area to be selected for printing in the next machine operation, the combination comprising sensing and recording means capable of sensing a magnetically encoded signal from the record member and also capable of recording a magnetically encoded signal on the record member; a print control relay; first switch means controlled by the print control relay and closed when said relay is energized; second switch means which are closed when the available printing space in an area is exhausted; recording switch means; a circuit path extending from a source of power to the sensing and recording means and including the recording switch means, the first switch means and the second switch means; and means to energize the print control relay and maintain it in energized condition during an operation of the machine, so long as no magnetically encoded signal is sensed by the sensing and recording means, whereby a magnetically encoded signal may be recorded on the record member under control of the recording switch means when the available printing space in an area is exhausted and no signal has been sensed from the record member.

3. In a machine of the class described, capable of printing in one or the other of two selected areas of a record member in response to a magnetically encoded signal on the record member, and capable of encoding signals on the record member to determine the area to be selected for printing in the next machine operation, the combination comprising recording means for applying a magnetically encoded signal to the record member; a circuit path for applying power to said recording means to effect the recording of a signal on the record member; first switching means in said path and operative in response to the prior presence or absence of a magnetically encoded signal to alter its condition; second switching means in said path and operative in response to the number of lines which have been printed in the area being utilized of the record member; and third switching means for applying power to said circuit path, whereby an area-selecting signal may be applied to the record member upon completion of said circuit path.

4. In a device of the class described, capable of printing data in selected areas of a record member, the combination comprising first and second printing means for printing in two areas of the record member; print control means for controlling said printing means; first cyclic operating means to set the print control means in a first position for causing printing on the record member in a first area by the first printing means; sensing means to sense a signal from the record member; second operating means operable in response to a signal sensed by the sensing means to cause the print control means to be set to a second position for causing printing on the record member in a second area by said second printing means; third operating means for setting the print control means to a third position to cause simultaneous printing in both of said areas of the record member by the first and second printing means; and disabling means controlled by said third operating means to prevent operation of said second operating means.

5. In a device of the class described, capable of printing data in selected areas of a record member, the combination comprising first and second printing means for printing in two areas of the record member; print control means for controlling said printing means; first cyclic operating means to set the print control means in a first position for causing printing on the record member in a first area by the first printing means; sensing means to sense a signal from the record member; second operating means operable in response to a signal sensed by the sensing means to cause the print control means to be set to a second position for causing printing on the record member in a second area by said second printing means; and third operating means for setting the print control means to a third position to cause simultaneous printing in both of said areas of the record member by the first and second printing means.

6. In a device of the class described, capable of printing data on selected areas of a record member, the combination comprising first and second printing means for printing on two areas of the record member; print control means for controlling said first and second printing means; first operating means for setting the print control means to a first position to cause printing in a first area on the record member by the first printing means; second operating means for shifting the print control means from said first position to a second position to cause printing in a second area of the record member by said second printing means; manually operable means for setting the print control means to a third position to cause printing in both of said areas of the record member by the first and second printing means simultaneously; and disabling means controlled by said manually operable means to prevent operation of said second operating means.

7. In a device of the class described, capable of printing data on selected areas of a record member, the combination comprising first and second printing means for printing on two areas of the record member; print control means for controlling said first and second printing means; first operating means for setting the print control means to a first position to cause printing in a first area on the record member by the first printing means; second operating means for shifting the print control means from said first position to a second position to cause printing in a second area of the record member by said second printing means; and third operating means for setting the print control means to a third position to cause printing in both of said areas of the record member by the first and second printing means simultaneously.

8. In a device of the class described, capable of printing data in selected areas of a record member having magnetic encoding thereon, the combination comprising first and second printing means for printing on two areas of the record member; print control means for controlling said first and second printing means; cyclic operating means for setting the print control means in a first position to cause printing on the record member in a first area by the first printing means; solenoid-operated means capable of setting the print control means to a second position for causing printing on the record member in a second area by the second printing means; sensing means for sensing a magnetically encoded control signal from the record member; and means responsive to said control signal for effecting the energization of said solenoid-operated means to cause printing in the second area of the record member.

9. In a device of the class described, capable of printing data in selected areas of a record member, the combination comprising first and second printing means for printing on two areas of the record member; print control means for controlling said first and second printing means; first cyclic operating means for setting the print control means in a first position to cause printing on the record member in a first area by the first printing means; second operating means capable of shifting the print control means from said first position to a second position for causing printing on the record member in a second area by the second printing means; sensing means for sensing a control signal from the record member; and means responsive to said control signal for actuating said second operating means to cause printing in the second area of the record member.

10. In a device of the class described, capable of printing data in selected areas of a record member, the combination comprising first and second printing means for printing in two areas of the record member; print control means for controlling said printing means; first cyclic operating means to set the print control means in a first position for causing printing on the record member in a first area by the first printing means; sensing means to sense a signal from the record member; second operating means operable in response to a signal sensed by the sensing means to cause the print control means to be set to a second position for causing printing on the record member in a second area by said second printing means; and manually operable means to control said second operating means to cause the print control means to be set to said second position for causing printing on the record member in said second area by said second printing means, regardless of whether or not a signal is sensed from the record member by said sensing means.

11. In a device of the class described, capable of printing data in selected areas of a record member, the combination comprising first and second printing means for printing in two areas of the record member; print control means for controlling said printing means; first cyclic operating means to set the print control means in a first position for causing printing on the record member in a first area by the first printing means; sensing means to sense a signal from the record member; and second operating means operable in response to a signal sensed by the sensing means to cause the print control means to be shifted from said first position to a second position for causing printing on the record member in second area by said second printing means.

12. In a device of the class described, capable of printing data on selected areas of a record member, the combination comprising first and second printing means for printing on two areas of the record member; print control means for controlling said first and second printing means; first operating means for setting the print control means to a first position to cause printing in a first area on the record member by the first printing means; and second operating means for shifting the print control means from said first position to a second position to cause printing in a second area of the record member by said second printing means.

References Cited in the file of this patent
UNITED STATES PATENTS

| | | |
|---|---|---|
| 1,608,145 | Tingley | Nov. 23, 1926 |
| 1,608,837 | Bryce | Nov. 30, 1926 |
| 1,620,068 | Bryce | Mar. 8, 1927 |
| 1,862,032 | Pierce | June 7, 1932 |
| 1,939,089 | Tauschek | Dec. 12, 1933 |
| 2,195,844 | Von Pein | Apr. 2, 1940 |
| 2,431,714 | Sundstrand | Dec. 2, 1947 |
| 2,645,994 | Carroll | July 21, 1953 |